United States Patent [19]

Thomas

[11] Patent Number: 5,205,067
[45] Date of Patent: Apr. 27, 1993

[54] DEVICE AND METHOD FOR TREATING MAUSOLEUMS AGAINST PHORID FLY INFESTATION

[76] Inventor: Matthew J. Thomas, 548 Mech St., Green Bay, Wis. 54302

[21] Appl. No.: 770,250

[22] Filed: Oct. 3, 1991

Related U.S. Application Data

[62] Division of Ser. No. 539,142, Jun. 18, 1990, Pat. No. 5,148,627.

[51] Int. Cl.5 .............................................. A01M 9/00
[52] U.S. Cl. ...................................... 43/125; 222/647; 222/83.5; 222/399
[58] Field of Search ...................... 43/125; 124/56, 63, 124/64; 222/83.5, 309, 399, 637

[56] References Cited

U.S. PATENT DOCUMENTS

| | | | |
|---|---|---|---|
| 2,899,106 | 8/1959 | Weinert | 222/83.5 |
| 3,159,311 | 12/1964 | Fowler | 222/83.5 |
| 3,162,332 | 12/1964 | Hayim | 222/399 |
| 3,193,146 | 7/1965 | Isgriggs | 222/83.5 |
| 3,193,147 | 7/1965 | Popp | 222/83.5 |
| 4,117,844 | 10/1978 | James | 222/83.5 |
| 4,446,990 | 5/1984 | Stevenson | 222/637 |
| 4,678,377 | 7/1987 | Bouchard | 222/637 |
| 5,039,017 | 8/1991 | Howe | 222/637 |

*Primary Examiner*—Kurt C. Rowan
*Attorney, Agent, or Firm*—Recka & Joannes

[57] ABSTRACT

A device for treating mausoleums against Phorid Fly infestation by discharging a cloud of dry powder insecticide into each sealed, mausoleum cell entombment, from outside the cell; the insecticide powder covers and adheres to all surfaces in the cell; the insecticide used is chosen from those insecticides relatively harmless to human beings, and that will continue to kill Phorid Flies for a period of time greater than the expected dehydration time of the contents of the sealed mausoleum cell, which dehydration time is from five to seven years.

7 Claims, 6 Drawing Sheets

DEVICE AND METHOD FOR TREATING MAUSOLEUMS AGAINST PHORID FLY INFESTATION

CROSS REFERENCE TO RELATED APPLICATION

This patent application is a divisional application of U.S. patent application Ser. No. 539,142, now U.S. Pat. No. 5,148,627 filed Jun. 18, 1990, by Matthew Thomas, for a Device and Method for Treating Mausoleums Against Phorid Fly Infestation.

BACKGROUND OF THE INVENTION

1. Field of the Invention

The invention is a device for eliminating, in a single insecticide treatment, Phorid Fly infestation in mausoleums. All surfaces inside a sealed mausoleum cell, containing an entombment, are covered with an insecticide. The insecticide used is chosen from those insecticides which will kill Phorid Flies and which will remain effective for a time period, greater than the expected dehydration time of an entombment in the cell.

2. Description of the Related Art

Current treatment for Phorid Fly infestation is done outside of the mausoleum cell. Treatment includes daily insecticide spraying of short active life aerosol insecticides in mausoleum visitor areas. Other devices used to treat Phorid Fly infestation are electrical devices that electrocute Phorid Flies. The treatment is based on the general belief in the industry that the infestation comes from flowers brought into the mausoleum area.

SUMMARY OF THE INVENTION

The invention is a compressed air injector gun used in combination with a long life insecticide. A quantity of insecticide, adequate to treat one cell, is contained in an insecticide cartridge.

An insecticide applicator, drills a small access hole into a sealed mausoleum cell, puts the insecticide cartridge in the injector gun and then blows the long life insecticide out of the gun and into the sealed mausoleum cell as a cloud of insecticide, with compressed air.

The single insecticide application permanently suppresses Phorid Fly growth in the treated cell.

It is an object of the invention to produce a permanent, single insecticide application treatment, to be applied to each sealed mausoleum cell, to prevent Phorid Fly infestation in mausoleums.

It is an object of the invention to develop a method of treatment against Phorid Fly infestation of mausoleums that minimizes contact of the applicator with the insecticide to be applied.

It is an object of the invention to produce a method of treatment against Phorid Fly infestation that minimizes contact of visitors to the mausoleum with the insecticide to be applied.

It is an object of the invention to produce a method of treatment, for Phorid Fly infestation that can be rapidly performed on a large number of entombments, during non-visiting hours, so as to not disrupt visitors to the mausoleum.

BRIEF DESCRIPTION OF THE DRAWINGS

Description of the Preferred Embodiment

DETAILED DESCRIPTION OF THE INVENTION

Figure 1:
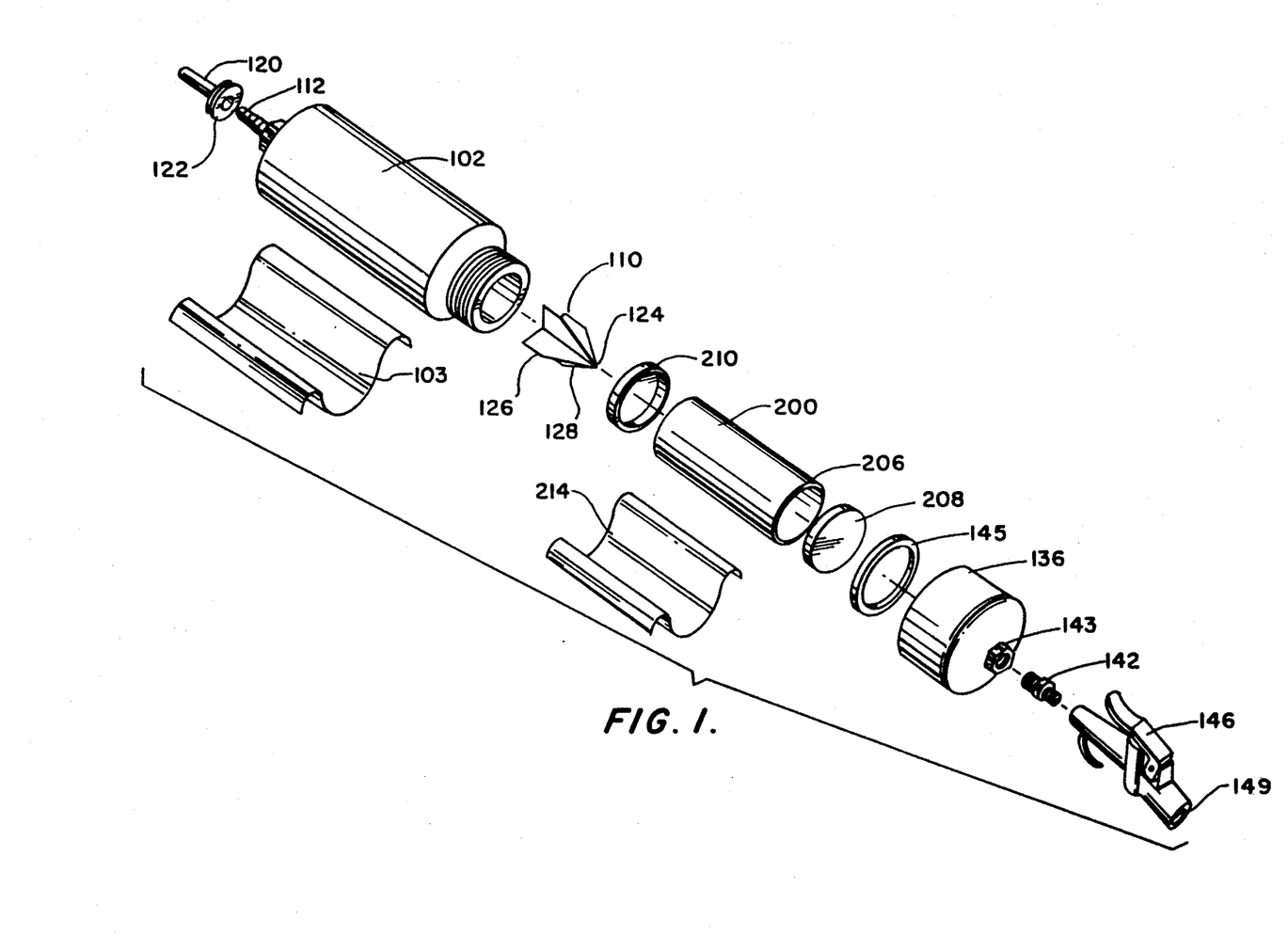
FIG. 1 shows the disassembled elements of the insecticide injecting gun and a disassembled insecticide cartridge.

FIG. 1 shows the disassembled elements of the insecticide injector gun 100. Also shown is a disassembled insecticide cartridge 200.

The injector gun 100 includes lower housing 102, in which the insecticide cartridge 200 is inserted, and sealing cap 136, which encloses the insecticide cartridge 200 within the central core 104 of gun 100.

Formed within lower housing 102 is central core 104. Central core 104 is divided into two sections, each with a separate function. The bottom of the central core 104 is used an expansion chamber, 106, as can best be seen in FIG. 2 and FIG. 3. The top of the central core 104 is used as an insecticide cartridge receiving chamber 108.

The two sections 106, the expansion chamber, and 108, the cartridge receiving chamber, are separated by splitter head 110.

Splitter head 110 is a four sided arrow shaped piece. The point of the arrow 124, is used to pierce an insecticide cartridge 200 forced into the cartridge receiving chamber 108. A shoulder 126 is formed at the base of the arrow sections 128.

The shoulder 126 serves as a stop to limit the distance in which a cartridge 200 can be pushed into central core 104. The shoulder 126 supports the bottom 204 of the cartridge 200, a specific distance into the receiving chamber 108. Shoulder (126) is a cartridge stop means and a cartridge support means.

At the bottom of injector gun 100, is mounted ejection fitting 112, through which insecticide 212 is forced out of the gun 100, by compressed air. The ejection fitting 112, has bore 116, formed through it. Bore 116 connects into the expansion chamber 106, through orifice 118.

Ejection fitting 112 is covered by a compressible resilient covering 120. The compressible resilient covering 120, is formed into self closing petals 121 at the end of ejection fitting 120. A raised compressible resilient washer 122 is mounted on the compressible resilient covering 120. The compressible resilient covering 120, and the sealing washer 122, prevent leakage of insecticide 212 from gun 100, around injection fitting 112, when the insecticide 212 within gun 100 is blown into a mausoleum cell 304, through an injection hole 306.

Shown in FIG. 1, between the bottom of the injector gun 111, in which is formed the central core 104, and the sealing cap 136, is located insecticide cartridge 200.

Insecticide cartridge 200 is composed of a heavy cardboard tube 206 and tube end caps 208 and 210. End caps 208 and 210 are made of a frangible, that is brittle, easily broken paper. End cap 208 and 210 mounted at the ends of the tube 206 and tube 206, form cartridge 200; cartridge 200 holds the charge of insecticide 212 necessary to treat a single cell 304. A warning label 214 is shown to the side of the cartridge 200. That warning label 214 is normally glued to cartridge 200.

Sealing cap 136 is internally threaded with threads 138. Threads 138 match external threads 140, on lower housing 102 providing means to screw lower housing 102 and sealing cap 136 together.

Mounted within sealing cap 136 is sealing cap washer 145. When sealing cap 136 is threaded onto lower housing 102, with a cartridge 200 mounted in receiving chamber 108, one end of cartridge 200 bears on splitter head shoulder 126 and the other end of cartridge 200 bears on sealing cap washer 145. Sealing cap washer 145 prevents insecticide 212 from leaking out of the injector gun 100, through threads 138 and 140, when air is forced through gun 100.

Air inflow fitting 142 is mounted on sealing cap 136. A bore 144 is formed through air inflow fitting 142 and extends into central core 104. An extension 143, of the air inflow fitting 142, is mounted to extend above the internal surface 147 of end cap 136. The extension 143 serves to break the frangible end cap 210, of the insecticide cartridge 200, as end cap 136 and lower housing 102, are screwed together. The breaking of end cap 208 as cartridge 200 is placed in injector gun 100 and the breaking of end cap 210 upon the sealing of gun 100 prevents contact of the applicator with the insecticide 212.

Attached to air inflow fitting 142 is on-off air valve 146. On-off air valve 146 is connected to air compressor 148 by air line 149. Normally a quick disconnect fitting from the air line is used.

Figure 2:
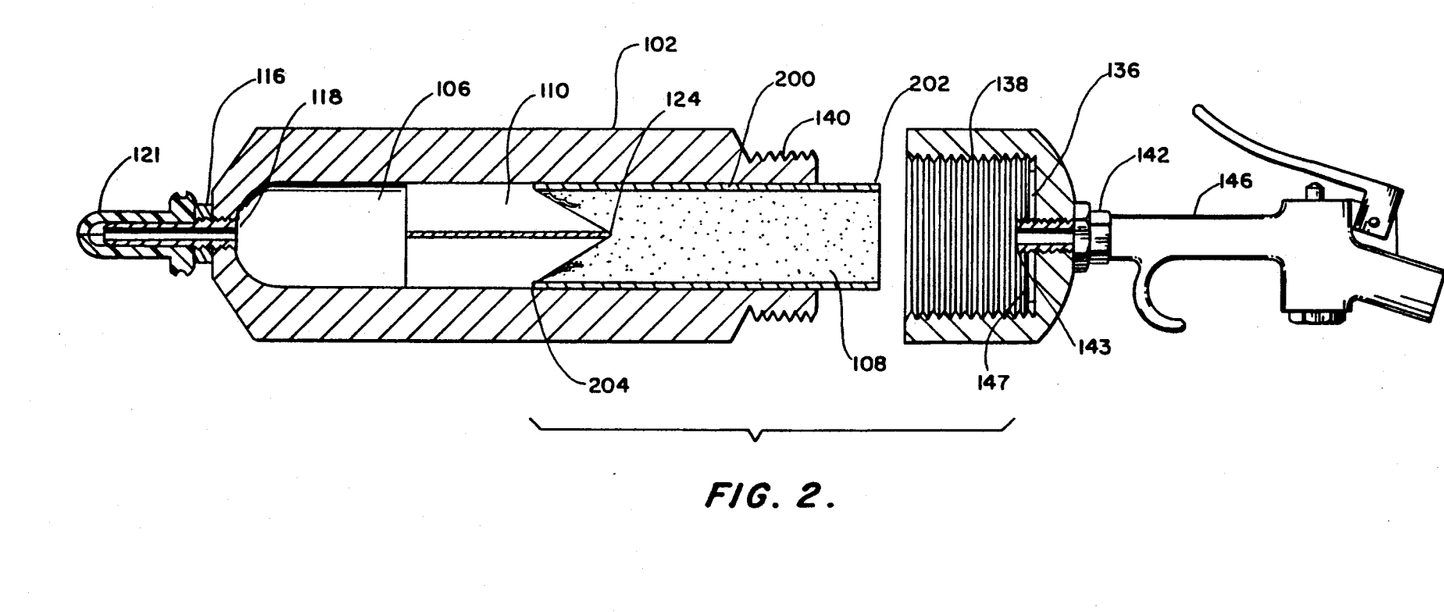
FIG. 2 is a sectional view of the insecticide injecting gun with the sealing cap removed.

FIG. 2 is a section view through injector gun 100, with insecticide cartridge 200 inserted in chamber 108.

The lower housing 102, is shown disassembled from sealing cap 136. An insecticide cartridge 200 has been removed by an applicator, from a container of insecticide cartridges 200 not shown and placed in the gun.

Cartridge 200 is forced into the insecticide cartridge receiving chamber 108 as shown in FIG. 2. Chamber 108 is a snug fit to cartridge 200.

The bottom 204 of insecticide cartridge 200 is stopped from further entry into chamber 108, by splitter head shoulder 126, which supports the bottom 204, of insecticide cartridge 100.

Arrow sections 128 split end cap 208, releasing the insecticide 212 into the expansion chamber 106, while at the same time the arrow sections 128 break up any clumps of insecticide 212 that may have formed.

Figure 3:
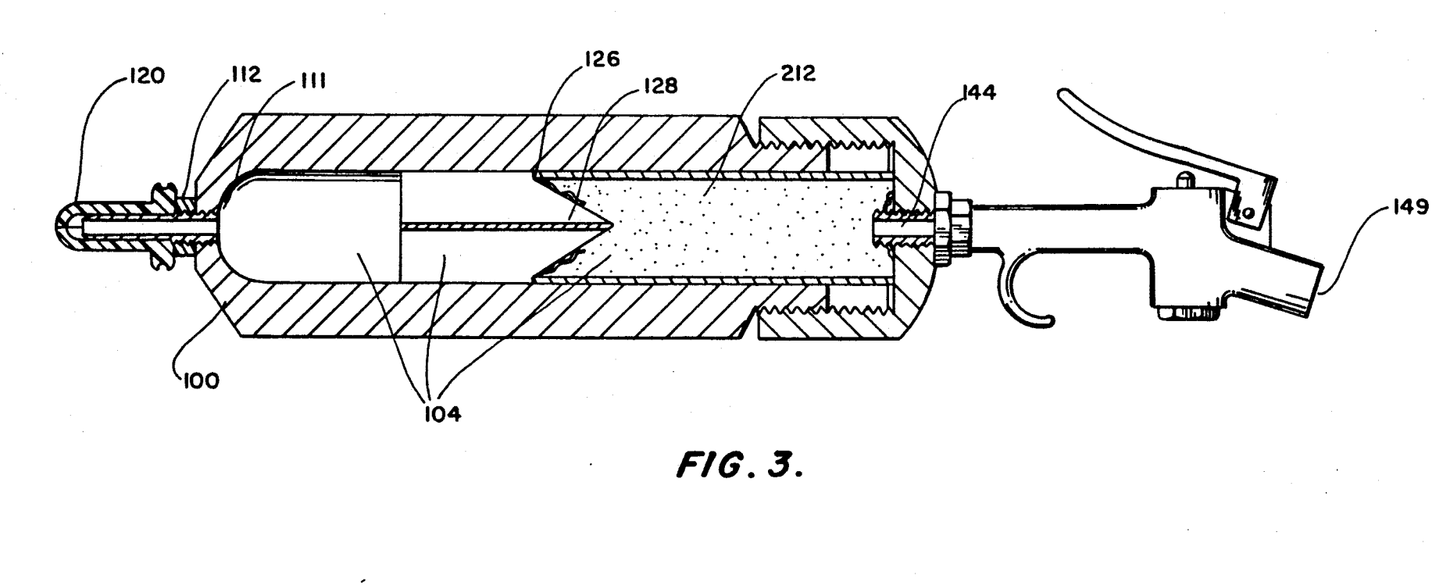
FIG. 3 is a sectional view of the insecticide injecting gun with the sealing cap screwed on and an insecticide cartridge inserted.
Figure 4:
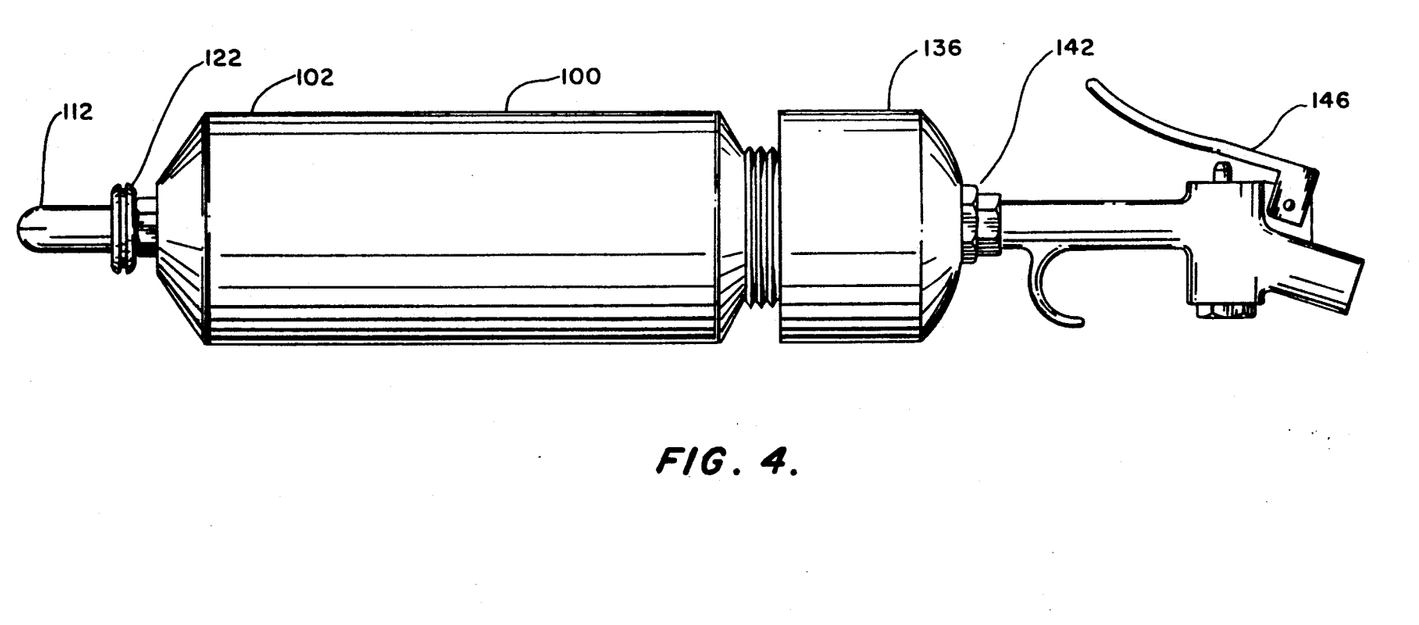
FIG. 4 is an external view of the insecticide injecting gun.

FIG. 3 shows the injector gun 100, with sealing cap 136, affixed to lower housing 102 by threads 138 and 140.

Insecticide cartridge 200 is shown in FIG. 3, as being supported within lower housing 102 by splitter head shoulder 126, and by internal surface 142 of sealing cap 136; the end of the cardboard tube 206, of insecticide cartridge 200, bears on washer 145. There is a slight crush fit of insecticide cartridge 200, between washer 145, bearing on the top of insecticide cartridge 202, and the shoulder 126 bearing on the bottom of the cartridge 204.

Air inflow fitting extension 143 extends outwardly from the internal surface 142 of sealing cap 136. When the sealing cap 136 is screwed on to the lower housing 102, the air inflow fitting extension 143 bears against and breaks the insecticide cartridge frangible end cap 210.

Air injected from compressor 148, through air line 149, passes into central core 104, through air inflow fitting bore 144; the air sweeps through central core 104, carrying insecticide 212 out of cartridge 200, through the expansion chamber 106, and then out of gun 100, through ejection bore 116. The air carries the insecticide 212, out of the gun and into mausoleum cell 304 as an insecticide dust cloud 318.

When sealing cap 136 is unscrewed from lower housing 102, after air has been blown through the injector gun 100, there is little or no residue of insecticide left in tube 206. Only the cardboard tube 206 and the fragmented end caps attached to the tube 206 are left to be flattened out and disposed of by the applicator.

Figure 5:
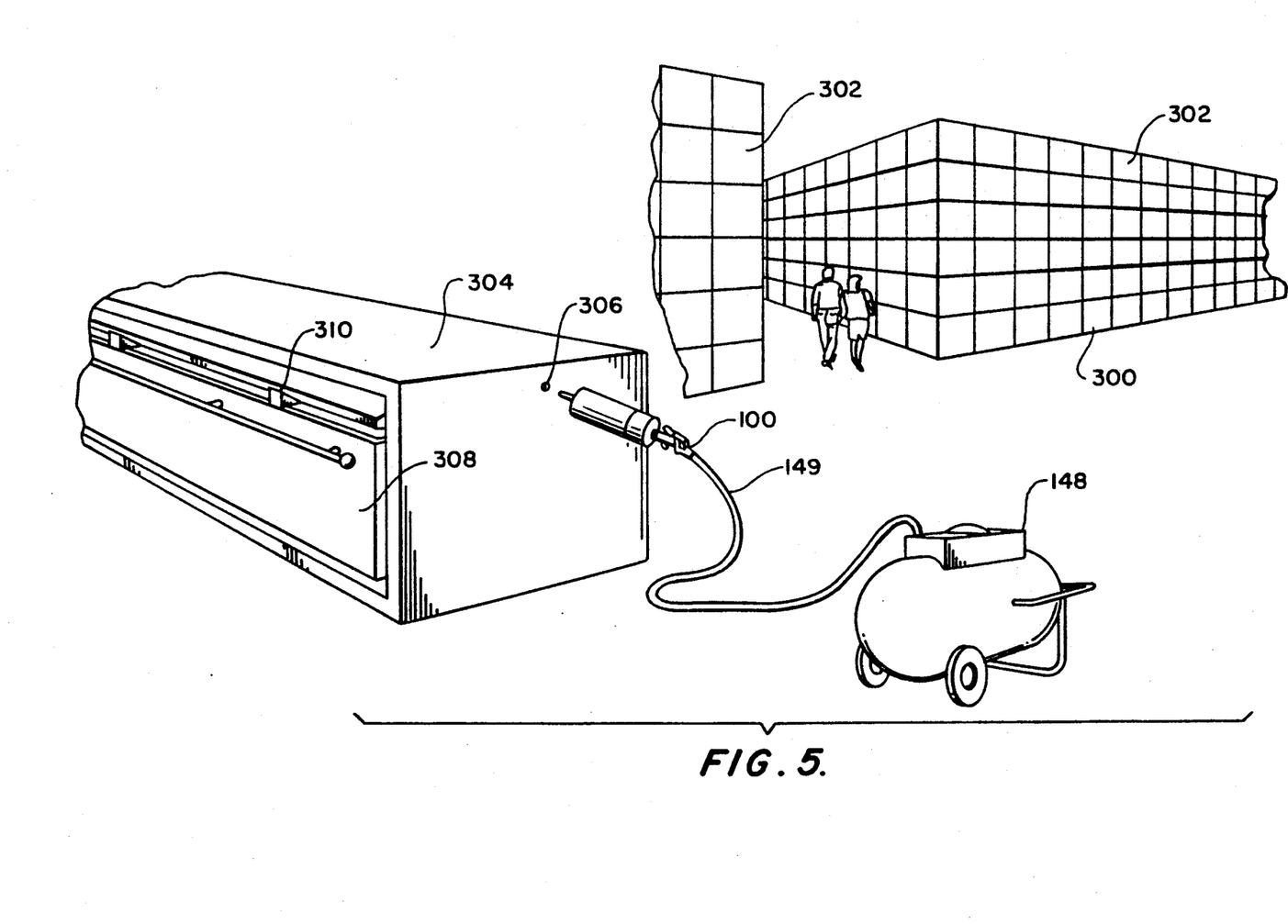
FIG. 5 is a stylized view of a mausoleum with a view of a single crypt being treated.

FIG. 5 shows a stylized view of a mausoleum 300. Cells 302 are shown as vertical rows, six high.

A stylized view of an individual mausoleum cell 304 with a mausoleum side wall removed is also shown.

Air compressor 148, air line 149 and injector gun 100 are shown beside an injection hole 306.

Within the mausoleum cell 304 can be seen an entombment, that is a casket 308, with two wedges 310 holding the top of the casket 308 open, so that insecticide 212 can enter the casket 308 and cover all surfaces therein as well as all surfaces within the sealed mausoleum cell 304. Use of the wedges in holding open the casket is optional. The insecticide covering all surfaces outside of the casket kills any Phorid Flies in the cell. Best Method however, is to wedge open the casket.

Figure 6:
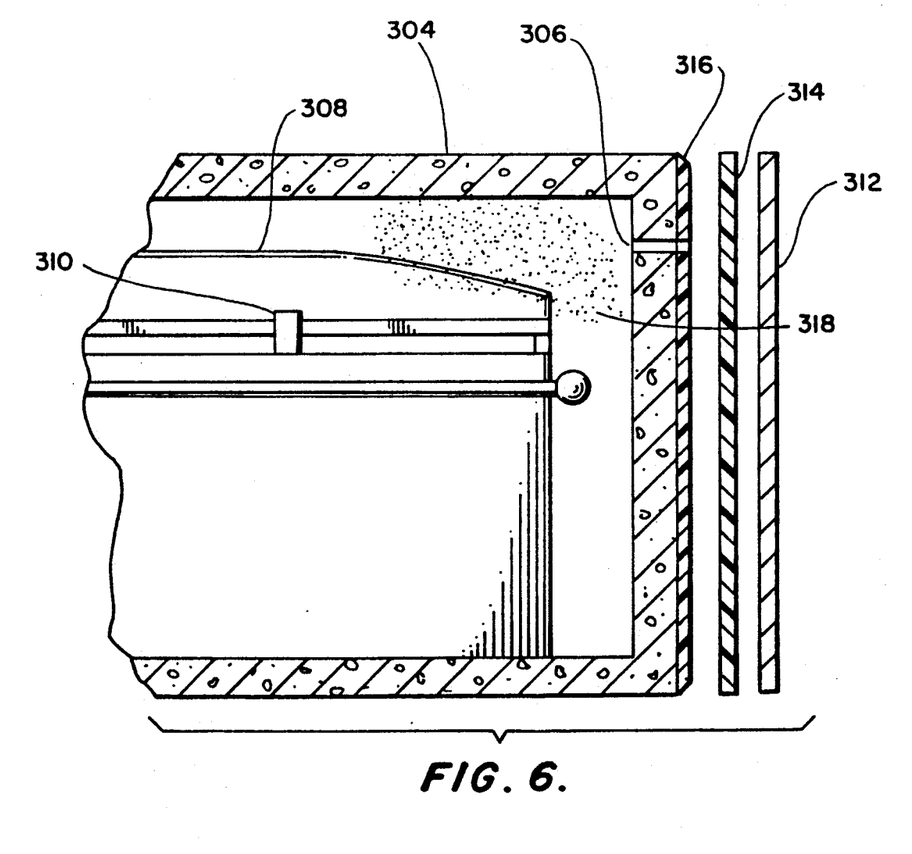
FIG. 6 is a section view into a mausoleum cell.

FIG. 6 is a side view into a mausoleum cell 302. Casket 308, and wedge 310 can be seen.

At the right of FIG. 6 can be seen decorative face plate 312. The decorative face plates are usually made of marble. The face plates carry a memorial of the decreased entombed therein.

Behind face plate 312 is located sealer plate 314.

Sealer plate 314 is made of a long life, non-organic material such as an asbestos, or other fiber re-enforced concrete material, such as the product sold under the trademark TRANSITE; sealer plate 314 can also be made of PVC plastic sheet.

The sealer plate 314 is permanently sealed to the cell 302 by caulk 316.

BEST METHOD

Mausoleums are becoming common because above ground burial is cheaper and a more ecologically efficient use of land.

A mausoleum is concrete structure with a honeycomb of concrete cells formed on the inside and outside of a central corridor, as shown in FIG. 5. The honeycomb cells are deeper, taller and wider than the largest container to be put in the cell.

Each mausoleum cell has a cell vent leading outwardly from the cell to a central mausoleum vent. The central vent, vents any pressure buildup in the cell to the atmosphere.

The mausoleum cells are arranged along the central corridor, with the cells extending vertically from floor to ceiling, as shown in FIG. 5. The central corridor of the mausoleum is used by visitors.

After the placing of a casket 308 in the cell 302, the cell 302 is closed off by a sealing face plate 314, which is caulked, 316, in place. A marble or other decorative surface 312 is then mounted as shown in FIG. 6.

Infestation of the visitor area of a mausoleum with the Phorid Fly annoys visitors.

Adult Phorid Flies are the size of fruit flies. Adult Phorid Flies are attracted to light. The Phorid Flies run rapidly over windows and walls and take flight when disturbed.

The venting of each mausoleum cell allows the Phorid Fly to enter the cell and to find media in which to reproduce. The continuing reintroduction of Phorid Flies into the cells, through the vents, and through small holes and cracks that form in concrete and around the caulk sealant of the cells, allows new generations of the Phorid Fly to be produced, until there is no longer a suitable media in which the flies can reproduce.

Spraying of mausoleum visitor areas with insecticides and electric bug killers located in the visitor areas are used to control Phorid Fly in mausoleums. The phorid fly treatments currently in use are not effective and require repeated applications. The treatments do not address the source of the problem. Many mausoleums forbid placement of memorial flowers in the visitor areas of the mausoleum, believing that the flowers and the soil in potted plants are the source of the infestation. Petitioner believes that his invention addresses the source of the infestation.

Petitioner determined that Phorid Fly infestation was propagated from within each cell.

Temporary insecticide treatment of the interior of a cell, such as by repeated injection of aerosol insecticide sprays, could be used to kill the Phorid Fly presuming the infestation was developing within each cell. Aerosol spray treatment would last from one to three months. Aerosol spray treatment is not practical. A typical mausoleum, with six thousand or more cells, would require constant work, during the limited time available outside of visiting hours. Repeated use of aerosol insecticides is not appropriate where applicators and visitors are to be exposed.

In 5 to 7 years, in a vented mausoleum, all Phorid Fly growth media in a cell is eliminated by dehydration.

A Phorid Fly insecticide treatment comprising a single injection of an insecticide with an effective life longer than the expected dehydration time of an entombment was developed. The treatment was designed to be performed with equipment found in a mausoleum maintenance department, in combination with an inexpensive insecticide injection gun to inject the insecticide.

The equipment and the system is used to treat cells already in use, whether infested or not, and is to be used in all fresh entombments.

The insecticide chosen in this best method has an effective life of at least seven (7) years and is reasonably safe to applicators and to visitors. A non evaporative media is desired as a carrier for the insecticide because the cells are vented and hydrocarbon media evaporates. A dry powder that adheres to the surfaces of the cell was chosen as insecticide carrier.

Both the method and the injector gun were designed to minimize employee and visitor contact with the insecticide before, during and after injection.

Tests were done, on a crypt facsimile made of wood and plexiglass, using talc as a dummy media. An air compressor was used to expel the talc test media as a cloud of dust into the cell and into a slightly opened casket. In the test, all surfaces of the cell of the casket were found to be covered with the talc after the injection. Injection of the media into a cell takes from 3 to 5 seconds at approximately 80 pounds per square inch air pressure. The volume of air injected is adequate to explosively discharge the insecticide, out of the expansion chamber 106, through bore 116 and then into the cell as a cloud of insecticide. The amount of air injected with the insecticide is not enough to increase pressure in the cell to a pressure level which would break seals and vent insecticide into visitor areas. Some insecticide injected does leak through bad caulk seals. The amount of insecticide leaked out is very small because the 1.9 ounces of insecticide is diluted by the amount of the volume of air in the whole cell before being blown back towards the sealer plate. The small, almost steam like leaks are useful in that they point out improper caulking and sealing which can then be recaulked. Improper sealing causes odor problems in mausoleums.

A suitable insecticide given the size of the Phorid Fly, and the maximum size molecule that the Phorid Fly can ingest, which is 6 microns, is sold as CRYPT-TOX, by Pepcis Corporation of Green Bay, Wis. The active ingredient of the insecticide has a micron size of 3 to 5 microns. The chemical name of the insecticide chosen as the best insecticide for this treatment is 44% 2,2-bis (p-methoxyphenyl)-1,1,1-trichloroethane, 8% other Isomers and related compounds; the insecticide is carried in a clay base.

Other long life pesticides could be used rather than use the insecticide cited in this Best Method listing. The constraints on the insecticide are the molecule size of the insecticide and the effective life of the insecticide that is the insecticide must continue to be effective to kill the Phorid Fly, longer than the dehydration time of an entombment.

As can be seen in FIG. 1, an insecticide cartridge containing a standard charge of one and nine tenths ounces of CRYPT-TOX is inserted in the gun shown in FIG. 1. The containment cylinder of CRYPT-TOX shown in FIG. 1, is made of heavy cardboard tube. The cardboard tube is sealed at both ends with frangible paper. The tubes are four inch long with an outside diameter of 1⅜ inches. The length of the gun is 7 and ½ inches. The injection hole is generally drilled at one half inch in diameter.

At one end of the insecticide injector gun is mounted an ejection nozzle which extends into the expansion chamber. At the end of the nozzle is approximately two inches of ejection fitting 112 extending out from the injector gun the injection fitting is covered with a soft compressible resilient material 120, incorporating a soft flexible washer 122, to allow making a good seal in a hole 306, drilled into cell 304, so that the insecticide can be sprayed into the cell without leaking. The resilient cover 120 is just slightly greater in diameter than ½ inch. The seal in hole 306 prevents insecticide from blowing out, onto the installer or into the visitor areas. The end of the nozzle is covered with four rubber lips or petals 121 that close off the injection nozzle hole when no air pressure is in the gun to prevent loss of insecticide.

In actual use, to treat an infested mausoleum, all decorative face plates would be removed from one level of occupied cells.

An operator, wearing a rubber dust and minor gas mask, and rubber gloves, would have readied a cart with a plurality of insecticide cartridges, a wheeled air compressor and an electric drill.

Each cell sealer plate, would be drilled with a hole 306 slightly smaller in diameter than the resilient covering on the ejection fitting. The resilient covering 120 and resilient washer 122 seal hole 306 and prevent escape of insecticide when air is blown through the injector gun.

Immediately on removing the drill, the injector gun ejection fitting 112 is forced into the injection hole 306 and a 3 to 5 second burst of air is made to force the insecticide out of the gun and into the cell. Any gas other than air could be used rather than air to expel the insecticide.

The injector gun is removed from the hole, after a short wait, to allow the injected air to escape out of the cell vent, and then the injection hole into the mausoleum cell is resealed with a bit of caulk.

Using this method, a large number of occupied, infested, mausoleum cells may be treated for Phorid Fly infestation in a short time.

In a new entombment, the casket top is optionally wedged open, in the cell, the sealer plate 314 is caulked to the cell, and after a week delay to allow the caulk to set, an injection hole is drilled into the cell and the contents of a treating insecticide cartridge are blown into the cell, through the injection hole, coating all surfaces, including optionally the contents of the casket with the insecticide and then the injection hole is sealed off.

I claim:

1. A device for treating mausoleums against Phorid Fly infestation comprising in operative combination:

(a) an injector gun (100) having a central core (104) formed therein;

(b) an insecticide cartridge (200) made of tube (206) and frangible tube end caps (208) and (210) containing a quantity of insecticide (212) placed within said central core (104), the quantity of insecticide (212) contained within the cartridge (200), being selectable to provide insecticide sufficient to coat all surfaces within a mausoleum cell; said insecticide (212) being carried in a powder base, said powder base selected having a property of adherence to all surfaces within a mausoleum cell; said insecticide being selected from those insecticides toxic to the Phorid Fly, relatively non-toxic to other life, having an insecticide life in which the insecticide remains toxic to the Phorid Fly, for at least five years;

(c) an air inflow fitting (142) having a bore (144) formed therethrough, affixed to said injector gun (100), said air inflow fitting bore (144) being in air flow relationship, through said bore (144) with the central core (104) of the injector gun (100);

(d) an ejection fitting (112) affixed to said injector gun (100), said ejection fitting (112) having an ejection fitting bore (116) formed therethrough, said ejection fitting bore (116) being in air flow relation, through an orifice, (118), with the central core (104) of the ejector gun (100);

(e) a compressable resilient covering (120) affixed to the outside of ejection fitting (112), a raised compressible resilient washer (122) mounted on covering (120); the compressible resilient covering (120), and the sealing washer (122) being operable to prevent leakage around ejection fitting (112) when the insecticide (212) is blown into a mausoleum cell;

(f) a source of compressed air (148) connected in air flow relation through the air inflow fitting bore (144) through central core (104) and out the ejection fitting bore (116).

2. A device of claim 1 wherein said insecticide is:

44% 2,2-bis (p-methoxyphenyl)-1,1,1-trichloroethane, 8% other isomers and related components in a clay base.

3. A device for treating mausoleums against Phorid Fly infestation comprising in operative combination:

a lower housing having a central core formed therethrough;

a sealer cap means demountably attachable to said lower housing, operative when attached to seal off said central core;

a shoulder (126) formed within said central core dividing said central core into;

an expansion chamber; and an insecticide cartridge receiving chamber;

an insecticide cartridge held within the insecticide cartridge receiving chamber;

a sealing cap washer;

the distance between the sealing cap washer and the support means being slightly less than the length of the insecticide cartridge when the sealer cap is attached to the lower housing;

an air inlet fitting, having a bore formed therethrough in air flow relation with the central core;

an air outlet fitting having a bore formed therethrough in air flow relation with the central core;

an on-off valve connected to the air inlet fitting;

a source of compressed air connected to the on-off fitting.

4. The device as in claim 3 where the insecticide cartridge comprises;

a cardboard tube;

a first end cap made of frangible paper; and a second end cap made of frangible paper.

5. The device in claim 3 further comprising means to puncture an end cap of an insecticide cartridge placed in the insecticide receiving chamber.

6. The device in claim 3 wherein the means to puncture an insecticide cartridge is two pointed interlocking flat surfaces extending into a seated insecticide cartridge.

7. The device in claim 3 further comprising means to puncture an end cap of an insecticide cartridge when the sealer cap is attached to the lower housing.

* * * * *